Aug. 16, 1932.    H. WEICHSEL    1,872,371
ALTERNATING CURRENT MOTOR
Filed Jan. 28, 1931
Fig. 1.
Fig. 2.
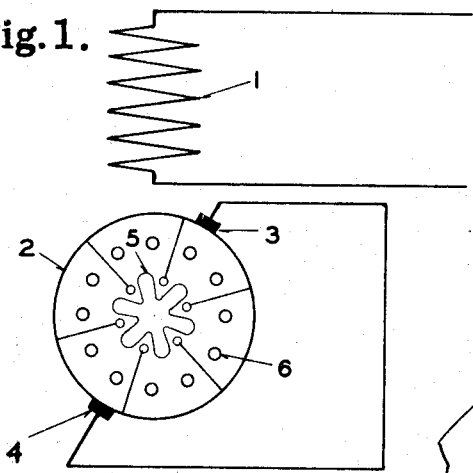
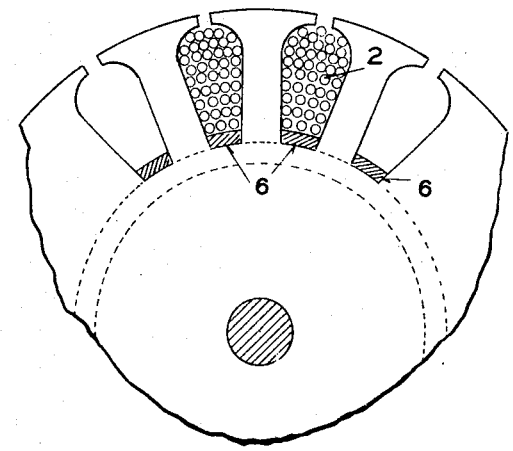
Inventor
HANS WEICHSEL
By E. E. Huffman
Att'y.

Patented Aug. 16, 1932

1,872,371

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

ALTERNATING CURRENT MOTOR

Application filed January 28, 1931. Serial No. 511,701.

My invention relates to single phase repulsion induction motors, its object being to provide motors of this type with means which will permit the centrifugal mechanism employed for converting the machine from a repulsion to an induction motor, to be set for operation at a speed near synchronism, thereby making it possible for the motor to accelerate to synchronous speed under higher loads. The means I have provided for this purpose also have the further advantage of reducing commutation sparking under repulsion motor operation.

In the accompanying drawing Figure 1 is a diagrammatic illustration of the circuits of a repulsion induction motor provided with my invention, the commutator short-circuiting mechanism being also diagrammatically indicated; and Figure 2 illustrates the disposition of the windings in the rotor of the machine.

Referring to Figure 1, the stator is provided with a main inducing winding 1 and the rotor with a commuted winding 2 with which the short-circuiting repulsion brushes 3 and 4 cooperate. 5 diagrammatically illustrates mechanism for short-circuiting the commuted winding along the plurality of axes, which mechanism may be actuated by a centrifugal device in the well known manner.

As thus far described the machine is constructed as an ordinary repulsion induction motor and for the purpose of improving its "pull-in" performance in the manner hereinabove indicated, I place high resistance short-circuited coils in good inductive relation with the commuted winding 2, these coils, whose conductors are indicated at 6, being preferably placed in the bottom of the slots containing the commuted winding and may be so joined as together to constitute a squirrel-cage winding. If not in squirrel-cage form the short-circuited coils should be so arranged as to span the same number of teeth as the coils of the commuted winding. These short-circuited coils are made of sufficiently high resistance that they do no reduce the starting torque of the machine more than approximately 30%, and under such condition they of course do not materially affect the running performance of the machine after it is converted into an induction motor by short-circuiting the commuted winding. They do, however, serve to provide an induction motor torque increasing with increasing speed, whereby the resultant torque at a sub-synchronous speed—the sum of the repulsion motor torque due to the winding 2, and the induction motor torque due to the winding 6—is higher than the repulsion motor torque alone. In the ordinary repulsion motor it is necessary to set the centrifugal mechanism to operate the commuted winding short-circuiting device at the speed at which the repulsion motor torque is equal to the induction motor torque which will become effective upon the short-circuiting of the commuted winding, and in my improved machine the short-circuiting mechanism will likewise be set to operate at the speed at which the resultant accelerating torque referred to equals the induction motor torque after the short-circuiting of the commuted winding. But this last mentioned speed will be materially nearer the synchronous speed than in the ordinary repulsion motor, thus substantially reducing the time required by the motor to accelerate an excessive load to synchronous speed and the value of the load which it can cause to reach this speed.

An application for motors of this type in which the presence of my invention is particularly useful is in the operation of air compressors where the power required to attain synchronous speed is often in excess of power consumed in normal operation, a condition which may be due, for example, to a cold state of the lubricating material employed in the compressor.

The presence of short-circuited armature coils, constructed in accordance with my invention, also greatly reduces commutation sparking during repulsion motor operation since these coils act as short-circuited secondaries with the coils of the commuted winding undergoing commutation and damp out the reactance voltages of these coils.

I preferably make the resistance of the short-circuited coils sufficiently high that the energy absorbed thereby—when the rotor is stationary, the brushes lifted, and a full line voltage impressed on the stator—is not greater than the normal full load output of the machine. This permits the improvement in the pull-in condition of the machine heretofore described without decreasing the starting torque more than I have indicated.

Having fully described my invention, what I claim as new and desire to secure by Letters Patent of the United States is:

In a single phase motor, the combination of an inducing member, an induced member provided with a commuted winding and short-circuited brushes cooperating therewith, high resistance short-circuited coils on the induced member in good inductive relation with the commuted winding and extending over the entire portion of the induced member embraced by said commuted winding, the total resistance of all of said coils being such that the energy consumed thereby when normal line voltage is impressed upon the inducing winding and the brushes out of contact with the commutator, is not greater than the full load output of the motor.

In testimony whereof, I hereunto affix my signature, this 23d day of January, 1931.

HANS WEICHSEL.